United States Patent [19]
Lynch et al.

[11] Patent Number: 5,761,843
[45] Date of Patent: Jun. 9, 1998

[54] BASS TAGS

[75] Inventors: Thomas A. Lynch, Nampa, Id.;
William A. Lynch, 1404 Burnett Dr.,
Nampa, Id. 83651

[73] Assignee: William A. Lynch, Nampa, Id.

[21] Appl. No.: 596,511

[22] Filed: Feb. 5, 1996

[51] Int. Cl.$^6$ ................................................ A01K 97/00
[52] U.S. Cl. ................................................ 43/4.5
[58] Field of Search ................ 43/4, 4.5; 24/300, 24/489, 3.13

[56] References Cited

U.S. PATENT DOCUMENTS

| | | | |
|---|---|---|---|
| 380,125 | 3/1888 | Lewis | 24/489 |
| 3,914,828 | 10/1975 | Noda | 24/489 |
| 5,027,477 | 7/1991 | Seron | 24/3.13 |
| 5,148,607 | 9/1992 | Lasiter | 43/4 |
| 5,615,454 | 4/1997 | Contarino | 24/3.13 |

*Primary Examiner*—Kurt Rowan
*Attorney, Agent, or Firm*—Frank J. Dykas

[57] ABSTRACT

Method and apparatus for tagging fish for identification, and collecting from those caught a chosen number of fish which are the heaviest in weight. To collect the heaviest fish, they are weighed as they are caught, and tagged with a clip-on colored identification tag which is attached to the fish's dorsal fin. The weight and color of the tag are recorded. Subsequently caught fish are weighed and tagged or released as necessary, so that the pre-selected number of fish kept are also the heaviest fish which were caught.

1 Claim, 1 Drawing Sheet

BASS TAGS

BACKGROUND OF THE INVENTION

1. Technical Field

This invention generally relates to fishing equipment, and more particularly to a fin clamp which is color coded for identification, and which clips on to the dorsal fin of a fish.

2. Background

A form of bass fishing which has become very popular in the United States involves fishing for bass during a bass tournament. In a typical bass tournament, fishermen are permitted to fish all day and at the end of the day, each fisherman turns in five fish to be weighed. Whichever fisherman has the greatest total weight for five fish wins the tournament. The five fish are weighed in alive for each fisherman and are released alive, with penalties for killed fish. During the day, as fishermen catch fish, the captured fish are typically placed in a live well in the bass fishing boat. This is a container which is constructed to keep the bass alive for a period of time. Each time the fisherman catches a fish, it is placed in the live well. Since the fisherman can only turn in five fish to be weighed at the end of the day, he wants those fish to be the largest five he has caught during the day. To determine the weight of each fish, it may be weighed as it is caught before being placed in the live well. When a fisherman has caught five fish, catching another fish means that one of the six fish caught will not count towards his total. For that reason, the fisherman would like to know which is the lightest fish, so he can remove the lightest fish from his live well and release it alive back into the lake, or release the most recently caught fish before adding it to the live well. The current method for selecting which fish to release and which to keep is to either select the lightest fish by its appearance, or to compare weights of the fish in some way. The former method may end up with a heavier fish being released and a lighter fish being kept. The later method is time consuming.

Accordingly, it is the object of this invention to provide a means for tagging bass as they are caught and weighed, so that weights and a color code can be recorded, and used to quickly select the lightest fish caught.

DISCLOSURE OF INVENTION

This object is accomplished by attaching to the bass a color coded marking device. At the time of capture, the fish is weighed, the fish is tagged with the color coded tagging device, and its weight and the color of its tag are recorded. When subsequent fish are caught, they are weighed and their weights are compared to the current inventory of fish. If the fisherman decides to release a previously caught fish because a more recently caught fish is heavier, he can easily see what the previous weights were and find the light weight fish by its color coded tag. The color coded tag is attached to the fish by an alligator clip-type clamp. These are finger operated and are attached to the dorsal fin of the fish. In this way, the fish is not harmed, the tag can be applied and removed manually, yet remains firmly attached and the color coded tag is towards the top of the live well and is thus easily seen. Before release of the fish, the color coded tag is removed and is available to tag any subsequently caught bass.

BEST MODE FOR CARRYING OUT INVENTION

Figure 1:
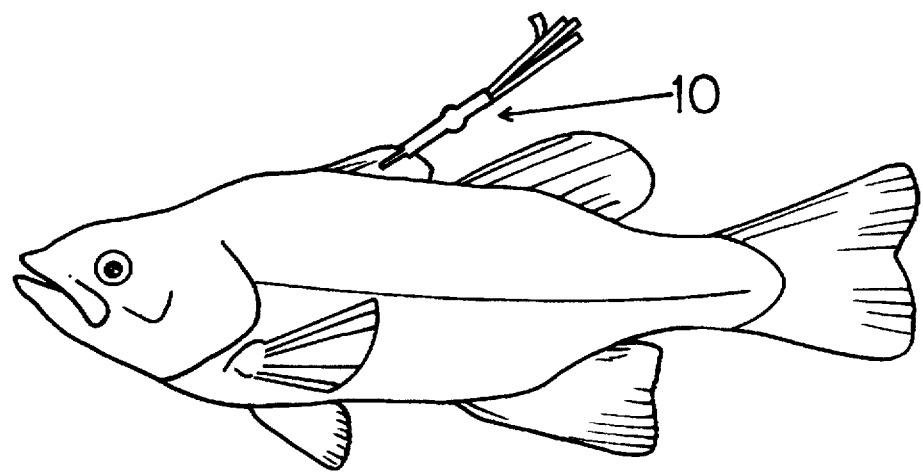
FIG. 1 is a side view of a fish with a bass tag attached to its dorsal fin.
Figure 2:
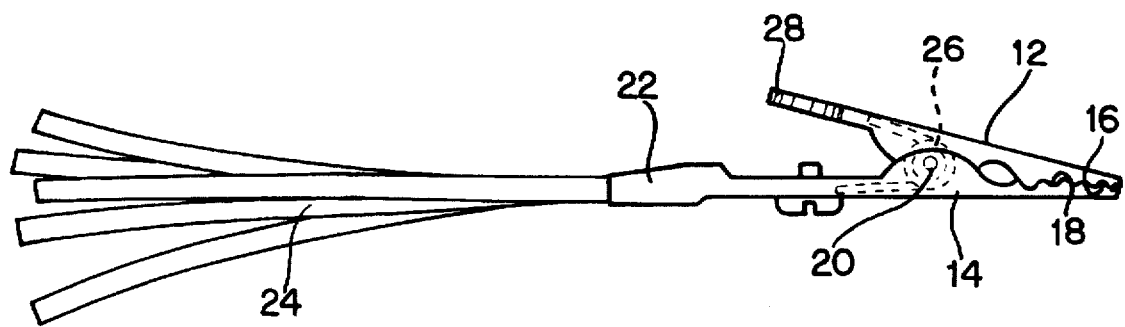
FIG. 2 is a perspective view of the bass tag.

Referring to FIGS. 1 and 2, a device for tagging bass or other fish is generally designated as 10 and is illustrated in its preferred embodiment. The first and only step in attaching a color coded tag to bass or other fish is clamping the tag to the fish's dorsal fin after it is caught. The fish would also be weighed and its weight and associated color code would be recorded. When the sixth fish is caught, it is also weighed, and its weight is compared with the five in the live well. The weights of these five fish are recorded on a card or piece of paper. If the sixth fish is heavier than one of the earlier caught five fish, the lightest of the previous five fish is identified using the colored tag, and taken from the live well. The tag is removed, and the fish is released alive back into the lake or river. This process is repeated throughout the day as new fish are caught.

The bass tag 10 consists of a jaw 12 and a jaw 14, which are connected to each other at hinge point 20. Jaw 12 has on one of its ends teeth 16. Jaw 14 has on one of its ends teeth 18. Jaw 12 has on its other end a release pad 28. Jaw 14 has on its other end a ribbon crimp 22. Ribbon crimp 22 grips colored ribbon 24, which extends away from jaw 14. Around hinge point 20 is located spring 26. When release pad 28 is depressed, jaw 12 and jaw 14 rotate in relation to each other and the surfaces of teeth 16 and 18 move apart. When release pad 28 is not depressed, spring 26 forces teeth 16 and 18 of jaws 12 and 14 to be pressed together.

The invention also consists of a method of marking fish for identification, using a clip-on device with colored means of identification.

While there is shown and described the present preferred embodiment of the invention, it is to be distinctly understood that this invention is not limited thereto but may be variously embodied to practice within the scope of the following claims.

We claim:

1. A method for collecting a pre-selected number of fish in a live well from a plurality of fish, comprising;

weighing of a fish after capture;

tagging of fish by attaching a clip-on identification tag with a color;

recording a weight of captured fish;

recording the color of the clip-on identification tag attached to captured fish;

adding subsequently caught fish to the live well until the pre-selected number is attained;

comparing the weights of fish caught subsequent to reaching the pre-selected number of fish with the weight of fish caught previous to reaching the pre-selected number;

selecting the fish with the lowest weight;

releasing the subsequently caught fish if it is lowest in weight;

determining the color of the clip-on identification tag associated with the fish which is lowest in weight, if the subsequently caught fish is not the lowest in weight;

identifying the fish which is lowest in weight by use of the color of the clip-on identification tag;

removing the fish which is lowest in weight from the live well;

removing the clip-on identification tag from the fish which is lowest in weight;

releasing the fish which is lowest in weight;

deleting the weight and color information about the fish which was released; and repeating this process as new fish are caught.

* * * * *